UNITED STATES PATENT OFFICE.

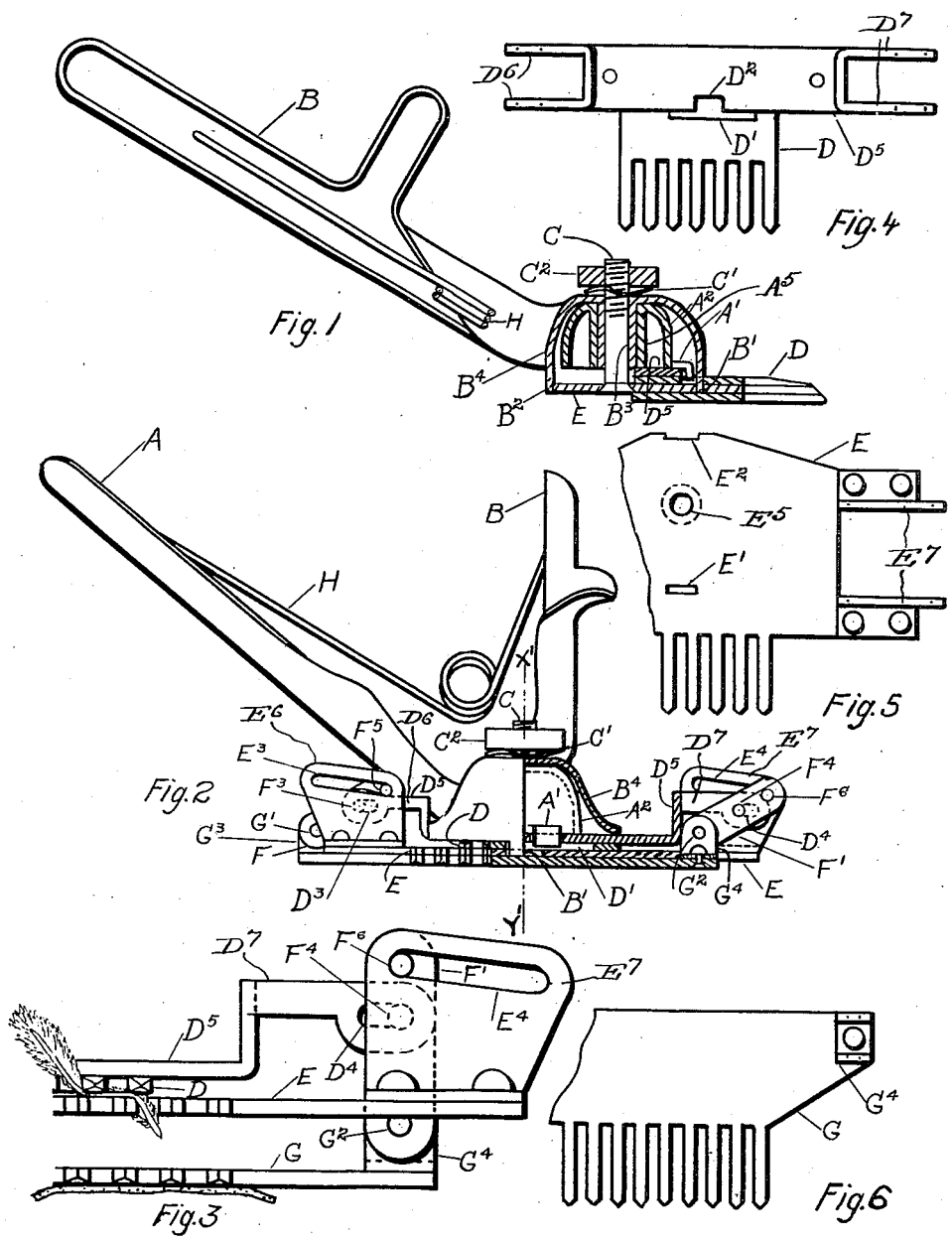

JAMES G. MACLAREN, OF MAMARONECK, NEW YORK.

POULTRY-PICKER.

1,065,458.

Specification of Letters Patent.  Patented June 24, 1913.

Application filed March 28, 1910. Serial No. 551,970.

*To all whom it may concern:*

Be it known that I, JAMES G. MACLAREN, of Mamaroneck, in the county of Westchester and State of New York, have invented certain new and useful Improvements in Poultry-Pickers, of which the following is a specification.

The present invention has reference to poultry-picking devices, and it comprehends, briefly, an improved device of the general class indicated in which a fork or comb is utilized to hold down the skin of the fowl while the feathers are being withdrawn between the prongs or teeth of the comb.

An embodiment of the invention is illustrated in the accompanying drawing, whereof—

Figure 1 is a transverse sectional view of the device taken on the line $x'$—$y'$ of Fig. 2. Fig. 2 is a front elevation with parts in section. Fig. 3 is an enlarged fragmental front elevation of the several combs included in the device, showing the positions assumed by the said combs when the handles are pressed together. And Figs. 4, 5 and 6 are plan views of the individual combs, Figs. 5 and 6 being of a fragmental character.

Corresponding parts or features are indicated by similar reference characters throughout the several views.

As shown in said drawings, the device comprises the following main parts, viz: a pair of handles A and B, of which the former is movable and the latter fixed, and three forks or combs D, E and G arranged in superposed relation, various instrumentalities being provided for effecting the requisite movements of the combs consequent upon the operation of the handles.

The stationary handle B is provided at its front or lower end with a hollow arched or dome-like hub $B^4$ within which is disposed a depending vertical sleeve $B^3$. This sleeve is constructed integral with the said hub and is designed to act as a support or journal whereon is rotatably fitted a sleeve $A^5$ that, in like manner, is disposed within and formed integral with the hub $A^2$ in the lower end of the movable handle A. The upper portions of the hubs $A^2$ and $B^4$ are provided with registering perforations through which projects the threaded upper end of the vertical bolt C that is fitted within the sleeve $B^3$ and is provided to retain the combs D and E in place, as hereinafter described. These combs are shown as in the form of flat plates having forwardly projecting teeth or prongs, the body portion of the middle comb E having the greatest width. The comb D is, by preference, of two-part construction, the upper member or section $D^5$ thereof being mounted upon the rear portion of the body of the main or lower member and being riveted to the same.

Comb D is designed for longitudinal movement upon and relative to comb E, and both of the combs just mentioned are designed to be raised and subsequently lowered in unison from and toward the bottom comb G. To effect the first mentioned movement, the lower edge of hub $B^4$ is provided at its front and rear portions with a pair of depending projections $B'$ and $B^2$, of which the front projection $B'$ extends through a longitudinal slot $D'$ formed in the body portion of comb D directly adjacent to the front edge of the upper comb section $D^5$ and fits in a seat $E'$ that is formed in the body portion of comb E in registration with said slot, while the rear projection $B^2$ fits in a seat $E^2$ formed in the rear edge of the aforesaid body portion of comb E. The lower front edge of the hub $A^2$ is in like manner provided with a similar projection $A'$ which fits in a seat $D^2$ that is formed in the front edge of the comb section $D^5$ and extends through the body portion of comb D. The arrangement is such, therefore, that when the handle A is pressed toward handle B, the engagement of projection $A'$ in seat $D^2$ will cause comb D to move toward the left upon comb E, the latter being held stationary during that time by the engagement of projections $B'$ and $B^2$ in seats $E'$ and $E^2$ and the passage of the said projection $B'$ through slot $D'$. When handle A is released, it will automatically assume its original position under the influence of a suitable spring H, which is engaged with both handles, and in so doing will effect the return movement of comb D, as will be understood.

Combs D and E are held in contact with each other through the agency of bolt C, as above stated, this result being obtained by fitting the headed lower end of the bolt in a countersunk seat or opening $E^5$ in comb E, and by applying to the threaded upper end of the bolt a nut $C^2$, between which and the top of hub $B^4$ is interposed a spring washer $C'$. The said washer imposes a tension directly upon the top of the hub $B^4$, the tension being transmitted to the top of hub $A^2$ and thence to sleeve $A^5$, the lower end of which latter rests upon comb section $D^5$, as shown in Fig. 1, with the result that comb D is pressed toward comb E which, in turn, is supported by the head of bolt C.

At its opposite ends the comb section $D^5$ is provided with pairs of longitudinally disposed lugs $D^6$ and $D^7$ which are arranged in spaced parallel relation and are formed with short oppositely disposed or alining slots $D^3$ and $D^4$, the said slots receiving, respectively, the cross-pins $F^3$ and $F^4$. These pins are normally disposed in the left-hand ends of the corresponding slots and their terminals are fitted in centrally located openings provided in pairs of links F and $F'$ that are fulcrumed at their lower ends on cross-pins $G'$ and $G^2$ mounted in upstanding U-shaped brackets $G^3$ and $G^4$ fastened by rivets or the like upon the ends of the bottom comb G. The brackets $G^3$ and $G^4$, and the pairs of links F and $F'$ are disposed between the pairs of lugs $D^6$ and $D^7$, and the upper ends of the aforesaid pairs of links are connected, in turn, by cross-pins $F^5$ and $F^6$, whose terminals are slidably fitted in alining pairs of slots $E^3$ and $E^4$ which are formed in pairs of spaced, parallel upstanding lugs $E^6$ and $E^7$. The lugs $E^6$ and $E^7$ are rigidly fastened upon the ends of the middle comb E and are disposed upon the opposite sides of the pairs of lugs $D^6$ and $D^7$, the pins $F^5$ and $F^6$ being normally disposed at the right-hand ends of the slots $E^3$ and $E^4$. In consequence of this arrangement, it will be apparent, that when handle A is pressed toward handle B, the comb D, during its initial movement toward the left, will pull pins $F^3$ and $F^4$ in the same direction, and since these pins are connected to the pairs of links F and $F'$, which are fulcrumed at their lower ends upon pins $G'$ and $G^2$, the said links will also be rocked or swung in the same direction. When the links are moved in the manner just described, the pins $F^5$ and $F^6$ that connect their upper ends are forced to travel toward the left in the slots $E^3$ and $E^4$ in the lugs $E^6$ and $E^7$, but since the bottom comb G (on which the brackets $G^3$ and $G^4$, carrying the fulcrum pins $G'$ and $G^2$ are mounted) is designed to be pressed against the skin of the fowl and, accordingly, is maintained in fixed position during the operation of the device, the travel of said pins $F^5$ and $F^6$ in the slots $E^3$ and $E^4$ will, of necessity, result in both the middle and upper combs E and D being raised bodily in unison above comb G into the position shown in Fig. 3, this being due to the normal upward inclination of the aforesaid links toward the right and to the fact that the slots $E^3$ and $E^4$ deviate but very slightly from an imaginary line passing through them and parallel with the combs.

The operation of the device, in brief, is as follows: The device is first pressed against the fowl, with the three combs G, E and D in mutual contact and the teeth of the said combs in alinement, after which it is moved along the fowl so as to cause the feathers to enter the spaces between the sets of teeth. Handle A is then forced toward the handle B, with the result that comb D is shifted toward the left upon the comb E, thus initially clamping the feathers between the teeth of the two combs just mentioned. As the movement of the comb D continues, the actuation of the links F and $F'$ is effected and the combs D and E raised bodily away from comb G, which latter remains pressed against the skin of the fowl. The upward movement of the said combs D and E causes them to pull out the feathers that are clamped between them. When handle A is released, all parts assume their normal relative positions and the device is ready for a repetition of this operation until the fowl is denuded of its feathers.

Having thus described my invention, what I claim and desire to secure by Letters-Patent is as follows:

1. A poultry picker comprising in combination means for holding down the fowl, a plurality of movable combs, means for producing relative motion of said combs for gripping the feathers, and means for moving said movable combs in a group with relation to said holding means.

2. A poultry picker comprising in combination a holding comb, a plurality of movable combs above said holding comb, means for producing relative motion of said latter combs for gripping the feathers, and means for drawing said movable combs away from said holding comb.

3. In a device for plucking feathers from fowls, a comb arranged to enter between the feathers, and a pair of plucking members relatively movable to said comb for drawing the feathers through the comb, the movement of one of said plucking members being parallel to the teeth of the comb.

4. In a device for plucking feathers from fowls, a comb arranged to enter between the feathers, and a pair of movable members disposed above said comb in close proximity thereto, one of said members being arranged to engage the other member for frictionally holding the feathers between the two members and both of said movable members having a conjoint movement for pulling the feathers through the comb, the movement of one of said members being parallel to the teeth of the comb.

In testimony whereof, I have signed my name to this specification in the presence of two subscribing witnesses, this twenty-second day of March A. D. 1910.

JAMES G. MACLAREN.

Witnesses:
 MATILDA C. RIFKIN,
 J. W. GANNT.